Patented June 10, 1924.

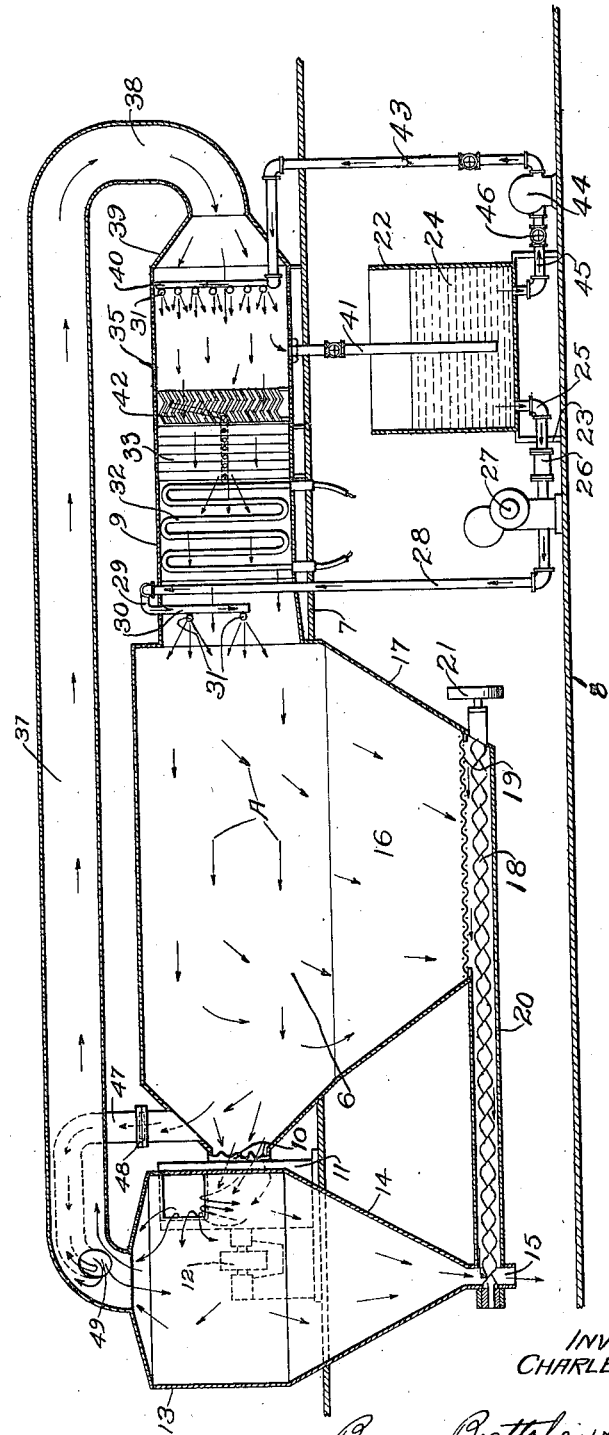

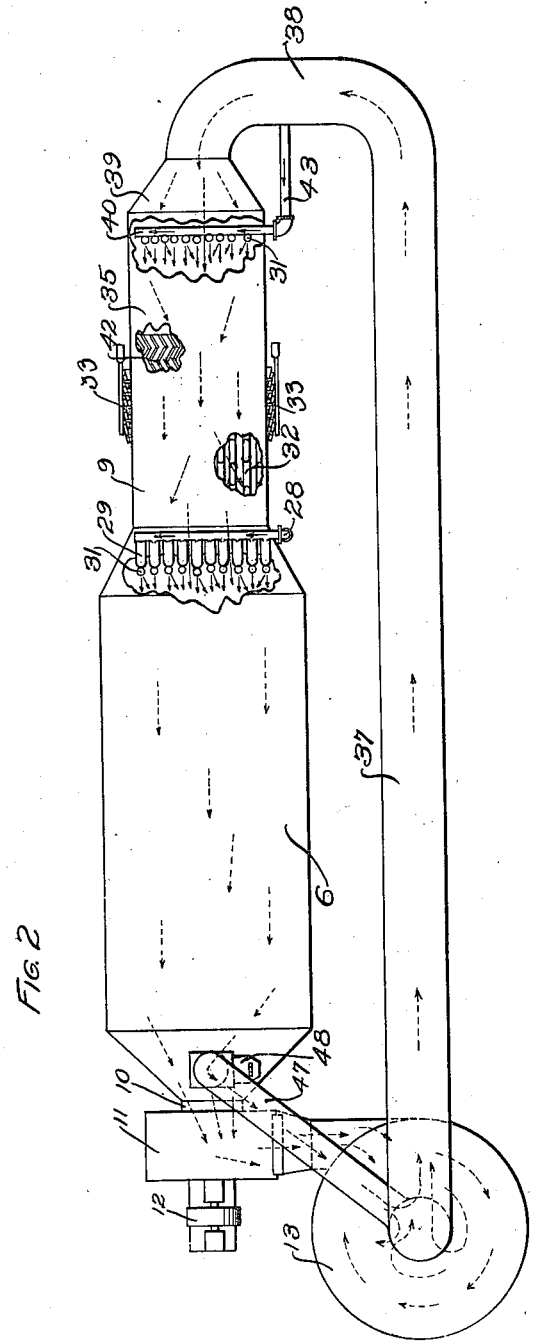

1,497,201

UNITED STATES PATENT OFFICE.

CHARLES WHEAT, OF PEORIA, ILLINOIS.

PROCESS AND APPARATUS FOR DEHYDRATING MAGNESIUM CHLORIDE.

Application filed August 9, 1920. Serial No. 402,422.

*To all whom it may concern:*

Be it known that I, CHARLES WHEAT, a citizen of the United States, residing at Peoria, in the county of Peoria and State of Illinois, have invented a certain new and useful Improvement in Processes and Apparatus for Dehydrating Magnesium Chloride, of which the following is a full, clear, concise, and exact description, reference being had to the accompanying drawings, forming a part of this specification.

This invention relates primarily to an improved process of dehydrating magnesium chloride or producing what is commonly known as anhydrous magnesium chloride.

While the invention resides principally in the method or process of producing anhydrous magnesium chloride, I shall describe in connection therewith one form of apparatus which I have employed for carrying out the various steps of the process for producing the finished product for commercial use.

The commercial uses of anhydrous magnesium chloride while having no intimate relation to the present invention will be referred to from time to time throughout the description.

Broadly speaking, my invention is a drying process, the object being to take the commercial magnesium chloride in liquid form, break up the same into fine particles, as by atomization, and subject the same to intense heat, say about 300° F., then withdrawal of the dust or fine powder resultant upon the application of this heat.

To those skilled in the art, it is well known that magnesium chloride is widely used as a binder for composition flooring and is usually combined with magnesium oxide to form the binder. It is also used in connection with and as a binder in grinding stones for polishing marble, or for any other similar purpose.

Magnesium chloride crystallizes with six molecules of water of crystallization. This hydrate is placed in a suitable tank and dissolved to about 25° Baumé. The substantially saturated solution is then drawn from a tank at high pressure and forced through suitable atomizing nozzles into a chamber through which dry gas is kept in motion and at a temperature of say 300° F. The temperatures and pressures which will be described later may be varied as found necessary in the process, but I have found the temperatures which have been mentioned and which will be mentioned later, together with the other proportions referred to, to be satisfactory. The entry of the magnesium chloride in sprayed form into the drying chamber practically immediately reduces the spray to a fine dust or powder, part of this powder being drawn from the chamber and the greater part of the remainder falling to the bottom. A suitable fan serves to maintain the flow of air through the chamber. While the foregoing describes a complete process, I shall further refer to and describe in detail later an addition to the device, wherein the very fine constituents of the finished product which float off are caused to be carried back to the starting point, redissolved and returned to the tank for re-atomization. As will appear from the following detailed description, the process involved in the apparatus as disclosed herewith provides practically a closed path of circulation, except for the point in said path of withdrawal of the finished product.

To better acquaint those skilled in the art with the manner of carrying out my invention, reference may be had to the following detailed description and appended claims taken in connection with the accompanying drawings, in which:

Figure 1 is a diagrammatic longitudinal sectional view of an apparatus which I employ for carrying out the drying process of this invention; and Figure 2 is a top plan of the same, partly broken away.

Referring now to the preferred embodiment of the apparatus for carrying out my improved drying process, 6 is a drying chamber mounted in a suitable support, such as the flooring 7, which latter may be one of two floors of a building. The other floor is shown at 8. The chamber 6 is provided with a spraying and heating alcove 9 extended to provide a washer chamber 35, which will be referred to later. Said drying chamber 6 has a constricted outlet 10 on the opposite end communicating with a rotary fan or exhauster 11 driven from a suitable prime mover (not shown) by means of a pulley 12 mounted on the fan shaft. The fan is termed an exhauster as it serves to exhaust the chamber 6, or at least to set up a continuous flow therethrough. Of course, any other suitable means may be employed for this purpose. The exhaust 11 discharges into a so-called "cyclone" collector 13 having an inverted conical bottom 14 provided with a discharge opening 15. A suitable receptacle, such as a burlap or other bag is provided for receiving the finished product.

The chamber 6 is provided with inclined side and end walls 16 and 17, respectively, which form a trough 18 in which a conveyor (in the present instance of the screw type) 19 rotates, the conveyor extending through a conduit 20 which discharges the contents of the trough 18 into the discharge opening 15 of the cyclone collector. The conveyor 19 is driven by a pulley 21 carried on one end thereof, said pulley being connected to a suitable prime mover (not shown).

A tank 22, which may be open at the top, is mounted on the floor 8 by suitable pedestals 23 and is supplied with liquid magnesium chloride as indicated at 24. The contents of the tank 22 are drawn therefrom through a pipe 25 and a strainer 26 by means of a high pressure pump 27 and delivered to a pipe 28 at a pressure of approximately 2000 lbs. to the square inch. The pipe 28 extends through and across the spraying and heating alcove 9 and is turned back into the alcove at 29 to form a spraying head 30 provided with the spraying roses 31. These roses or nozzles are arranged in two or more parallel banks and discharge horizontally into the chamber 6. A heating coil 32 is mounted in the rear of the alcove 9 and serves to heat gas flowing through the alcove. The side walls of the alcove between the same and said saturating chamber are open and closed at will by means of shutters 33, for a purpose described presently. Steam under pressure of 100 pounds is supplied to the heating coils 32 which provide a temperature of about 300° F. Of course, as pointed out hereinbefore, I do not limit myself to the pressure at which the magnesium chloride is sprayed into the chamber 6, nor do I limit myself to the temperatures recited above.

The invention as described so far is entirely operable without the parts which will be presently described, but for the sake of economy I have provided a practically closed path, the advantages of which will become apparent as this dsecription proceeds.

A return conduit 37 conducts the lighter particles of the magnesium chloride from the top of the cyclone collector 13, this conduit 37 passing over the chamber 6 and alcove 9 and being turned upon itself as at 38 and being provided with a flared end 39 for connection to the washing chamber 35. The washing chamber, as pointed out hereinbefore, communicates directly with the alcove 9 subject to control explained later, this chamber 35 having mounted therein a spraying device 40, the spraying device 40 being arranged to spray magnesium chloride solution in liquid form into the chamber 35. This saturated solution mingles with the particles arriving through the conduit 37, carrying these particles together with the solution downwardly through a pipe 41 into the tank 22. To prevent the contents of the chamber 35 from reaching the drying chamber or alcove 9, I provide a plurality of baffles 42 between the alcove and the chamber 35. The spraying device 40 is connected through a pipe 43, pump 44, and pipe 45 with the solution of magnesium chloride contained in the tank 22. A valve 46 in the pipe 45 controls the flow of the solution through said pipe.

I have discovered that in the process of drying magnesium chloride that there may be a slight unbalanced pressure between the chamber and the conduit 37. To obviate this, I provide a second conduit 47 controlled by a gate valve 48, this gate valve controlling when desired the flow of dehydrated magnesium chloride, the outer end of the conduit 47 connecting at 49 with the conduit 37, thereby equalizing the pressure.

In carrying out the process of my invention with the apparatus described hereinbefore, the operation is as follows:

Magnesium chloride crystals are placed in the tank 22 and dissolved to, preferably 25° Baumé. This liquid solution is propelled by the pump 27 at very high pressure to the atomizers 31 and ejected and sprayed into the chamber 6. As explained hereinbefore, steam at 100 pounds pressure is supplied to the heating coils 32 whereby to maintain the temperature of the chamber 6 at about 300° F. The exhauster 11 draws gas through the chamber in the direction of the arrows A, the heated gas in the chamber immediately drying the spray delivered from the atomizers and producing a fine dust or a powder. The heavier particles of this powder drop into the trough 18 through the screen 16 and are conveyed by the screw conveyor 19 to the outlet 15. The finer particles are carried through the exhauster to the cyclone collector and deposited to the bottom thereof. The very fine and light particles of spray which have been dried are either delivered through the conduit 47, or are delivered from the top of the cyclone collector through the conduit 37 to the chamber 35, and from the chamber return to the tank 22.

I have discovered by actual use of the process involved in my invention that the temperature of the particles of magnesium chloride dried in the chamber 6 drops materially after the actual drying of the same has taken place. The shutters 33 may be regulated to admit more or less air at atmospheric temperature and pressure to the alcove 9, this being determined as necessary, depending upon the degree of dehydration which is desired. These shutters also serve to permit escape of excess vapor. Another factor which enters into the drying process is that by changing the temperature of the heating coils and the pressure with which the saturated solution is sprayed into the chamber 6 various degrees of dehydration of the magnesium chloride can be obtained.

While the foregoing description and the accompanying drawings disclose one form of apparatus for carrying out the improved process of my invention, I desire that it be understood that I do not limit myself to the details thereof, except in so far as those limitations imposed by the scope of the appended claims. In this connection, it will be apparent that it is entirely feasible to employ other means than the exhauster 11 for setting up a movement of gas through the drying chamber and alcove 9 and it will also be apparent that other means may be employed for heating the gas.

I claim:

1. The process of dehydrating magnesium chloride comprising dissolving the crystals thereof to form a saturated solution, atomizing this solution, and applying intense heat to the particles produced by said atomizing.

2. The process of dehydrating magnesium chloride comprising dissolving the crystals thereof to form a saturated solution, atomizing this solution, and introduction of the particles thereof produced by atomizing into an area of high temperature.

3. The process of dehydrating magnesium chloride comprising dissolving the crystals thereof to form a saturated solution, reducing this solution to a fine spray and simultaneously subjecting the spray to a relatively great heat.

4. A process for dehydrating magnesium chloride comprising dissolving the crystals thereof to form a saturated solution, forcing this solution under high pressure through atomizers, subjecting the resultant spray to high temperature to remove the moisture therefrem, separating the finer particles remaining, and returning them for re-solution.

5. The process for dehydrating magnesium chloride, comprising establishing a heated current of dry gas, dissolving crystals of magnesium chloride to form a saturated solution, introducing this solution into the current of gas under high pressure to form a spray, entraining the resultant powders in the current of heated gas and collecting them and returning the residue thereof for re-solution.

6. The method of dehydrating magnesium chloride which consists in reducing the crystals thereof to a saturated solution and spraying this solution in the presence of a relatively great heat.

7. The process of dehydrating magnesium chloride comprising dissolving the crystals thereof to form a solution, atomizing this solution, and applying heat to the particles thus produced.

In witness whereof I hereunto subscribe my name this 13th day of July, 1920.

CHARLES WHEAT.